United States Patent [19]
Johnson et al.

[11] 4,347,528
[45] Aug. 31, 1982

[54] G2 SET-UP CIRCUIT FOR A TELEVISION RECEIVER

[75] Inventors: Fred D. Johnson, Evanston; George J. Tzakis, Glenview, both of Ill.

[73] Assignee: Zenith Radio Corporation, Glenview, Ill.

[21] Appl. No.: 244,422

[22] Filed: Mar. 16, 1981

[51] Int. Cl.³ .......................... H04N 9/62; H04N 9/20
[52] U.S. Cl. ........................................ 358/10; 358/65
[58] Field of Search ...................... 358/10, 29, 34, 65

[56] References Cited
U.S. PATENT DOCUMENTS 3,670,095  6/1972  Arumugham .................... 358/10

*Primary Examiner*—John C. Martin

[57] ABSTRACT

A circuit is disclosed for establishing proper video output voltages in a color television receiver prior to setting the receiver's G2 voltage. In the preferred embodiment, the circuit includes three emitter follower stages, each coupled to the output of a video amplifier. The collectors of the emitter follower stages are coupled to a supply voltage through a common resistance. A two position switch is connected across the common resistance such that, during normal receiver operation, closure of the switch shunts the common resistance. When G2 set-up is to be effected, the switch is opened so that a predetermined voltage is dropped across the common resistance and the three emitter follower stages have similar, predetermined D.C. output voltages.

4 Claims, 3 Drawing Figures

G2 SET-UP CIRCUIT FOR A TELEVISION RECEIVER

BACKGROUND OF THE INVENTION

The present invention is generally directed to improvements in color television receivers. It is particularly directed to a set-up circuit for establishing a predetermined voltage at the outputs of video amplifiers when the receiver's G2 voltage is being set for proper cut-off of the receiver's electron guns.

It is conventional practice in the television industry to adjust the G2 voltage of a receiver's CRT (cathode ray tube) so that the electron gun with the highest cut-off point is barely emissive. Prior to making such adjustment, the output voltages of each of the three video amplifiers are set to a common voltage level. FIG. 1 illustrates a typical arrangement for setting the output voltages of the three video amplifiers.

As shown, the video amplifiers each include a transistor operating as a common emitter amplifier for its color-difference input and as a common base amplifier for its luminance input such that an amplified video output is taken at the collector of each transistor. The output of the red amplifier drives a cathode 10 in the receiver's CRT. The collectors of the green and blue amplifiers are also coupled to other cathodes (not shown).

In normal operation, the emitter resistors of the three amplifiers are coupled via a switch 12 to the emitter of a transistor 14 which receives the Y or luminance signal at its base for mixing with the color-difference signals received by the three amplifiers.

For G2 set-up, the switch 12 is coupled to a grounded resistor 16. The purpose of this arrangement is to cause the collector of each amplifier to be at the same D.C. voltage level when the G2 voltage is adjusted for proper cut-off.

The problem with this arrangement, and others like it, is that the collector voltage of each amplifier is also a function of its base voltage. The base drive for each amplifier is derived from the output of a color-difference demodulator. Because the demodulator's outputs tend to drift and to be unequal, it is difficult to ensure that the collector voltages of all three amplifiers are at the same level when the switch 12 is in its illustrated position.

This problem is of greater significance for so-called RGB systems in which the output amplifiers receive R, G and B inputs rather than color-difference inputs. These R, G and B inputs each have a D.C. level which will vary as the brightness control is adjusted. Hence, the outputs of the R, G and B amplifiers will vary accordingly, thereby making it more difficult to obtain proper G2 set-up. Many other types of G2 set-up circuits suffer from the same problem, therefore preventing the G2 voltage from being properly set.

OBJECTS OF THE INVENTION

It is a general object of the invention to provide an improved G2 set-up circuit for a color television receiver.

It is a more specific object of the invention to provide a G2 set-up circuit which establishes the same predetermined voltage at the outputs of the video amplifiers, irrespective of their input levels.

BRIEF DESCRIPTION OF THE FIGURES

The objects stated above and other objects of the invention are set forth in the following detailed description and the accompanying drawings, of which.

DESCRIPTION OF THE PREFERRED EMBODIMENT

Figure 1:
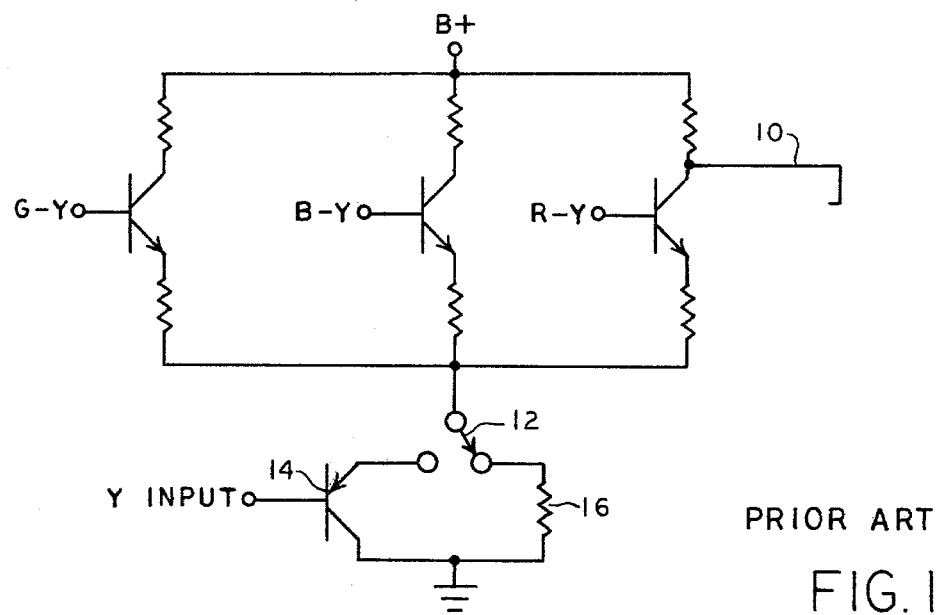
FIG. 1 shows the conventional G2 set-up circuit which has been previously described.
Figure 2:
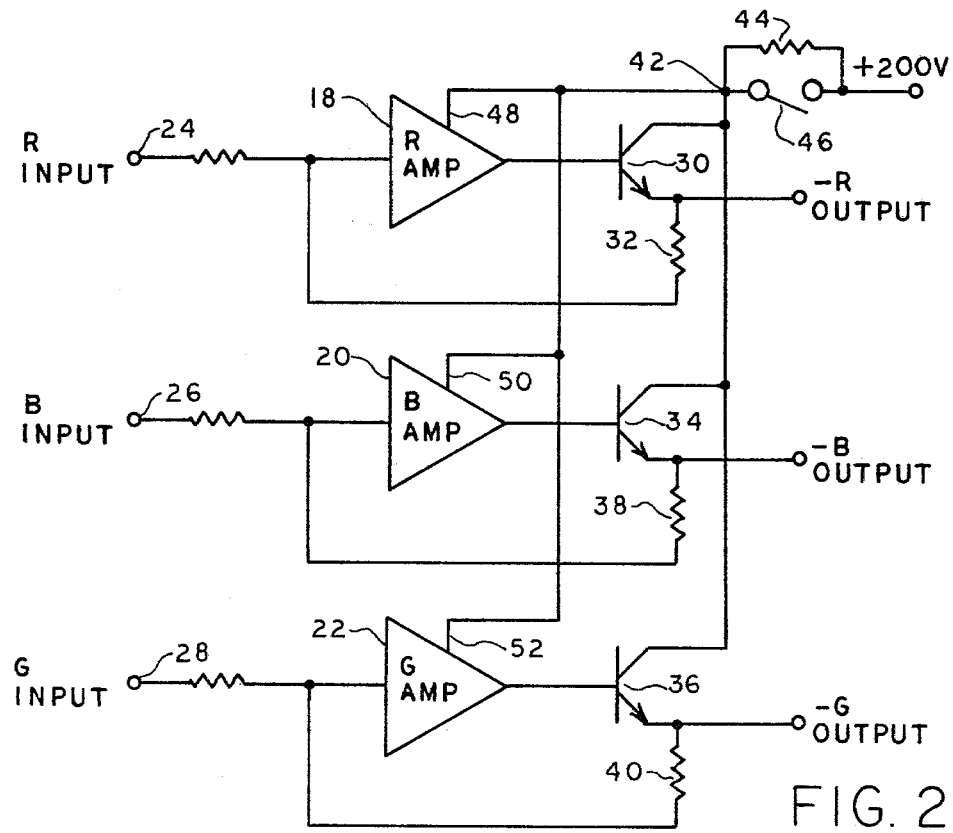
FIG. 2 shows a G2 set-up circuit in accordance with the invention.

Referring to FIG. 2, a preferred embodiment of the present G2 set-up circuit is shown in combination with a red amplifier 18, a blue amplifier 20 and a green amplifier 22. The three amplifiers may be conventional and similar to each other.

The amplifier 18 receives an R video input at terminal 24, the amplifier 20 receives a B video input at a terminal 26, and the amplifier 22 receives a G video input at an input terminal 28. The signal inputs at terminals 24, 26 and 28 are normally derived from chroma demodulators, and the average D.C. levels of those signals are generally somewhat different from each other. In addition, those D.C. levels tend to drift with variations in temperature. The present circuit develops equal video output voltages of a predetermined level for setting up the G2 voltage, irrespective of the D.C. values of the signals at terminals 24, 26, and 28.

Toward this end, the output of the amplifier 18 is coupled to the base of an output transistor 30 which operates as an emitter follower. The emitter of that output transistor is coupled to an emitter resistance 32, across which a minus R output voltage is developed.

In like manner, the outputs of amplifiers 20 and 22 are coupled to the bases of output transistors 34 and 36, and resistances 38 and 40 are coupled to the emitters of transistors 34 and 36, respectively. Minus B and minus G output voltages are developed across the resistances 38 and 40.

The collectors of transistors 30, 34 and 36 are coupled to a node 42, and a common resistance 44 is coupled between the node 42 and a supply voltage which may be 200 volts. A two position switch 46 is coupled across the resistance 44 for shunting it when normal operation is desired.

Power for each of the amplifiers may be provided by coupling the node 42 to the power inputs of the various amplifiers, as indicated by leads 48, 50, and 52.

In normal operation, the switch 46 is closed to shunt the resistance 44 and couple the full power supply voltage to the collectors of transistors 30, 34, and 36. In this condition, the amplfiers and output transistors operate in their normal mode to provide amplified $-R$, $-B$ and $-G$ video signals which may be conventionally coupled to three cathodes (not shown) in the receiver's CRT.

The receiver will normally include a customer operable brightness control which varies the D.C. level of the signals at terminals 24, 26, and 28. When it is desired to set the receiver's G2 voltage, the switch 46 is opened and the brightness control is adjusted to reduce the receiver's brightness and lower the voltages at terminals 24, 26, and 28 until the amplifiers 18, 20, and 22 are cut off. As a result of being cut off, the outputs of the amplifiers rise toward the power supply voltage and cause the output transistors 30, 34, and 36 to saturate. As is explained in more detail below, this operation causes the emitters of transistors 30, 34, and 36 to be driven to equal voltages of a predetermined level (175 volts, for example).

With the switch 46 open, the currents carried by the output transistors all flow through the common resistance 44. Assuming that the resultant voltage drop across the resistor 44 is 25 volts, the potential at node 42 will be at 175 volts. Because the output transistors are saturated, the potential at each of their emitters will also be at about 174 volts.

It should be noted that the 175 volt output of the transistors 30, 34, and 36 is not substantially affected by the D.C. voltage at terminals 24, 26, and 28 because all the amplifiers are cut off.

With a 175 volt potential having been established at the emitter of each output transistor, the G2 voltage may be properly adjusted in the conventional manner. That is, the G2 voltage is increased slowly until the receiver's CRT shows one color. If two or more electron guns have the same cut-off characteristics, then two or more colors will appear simultaneously.

To select an appropriate value for the common resistance 44, it suffices to know the desired cut-off voltage and the voltage at which the amplifiers become cut off. Assuming that the emitter resistors 32, 38, and 40 are each selected to have an impedance of 150 thousand ohms, that the voltage which cuts off an amplifier is 10 volts, and that an output voltage of 175 volts is desired for setting cut-off, then the current carried by each emitter resistor equals about 1.1 milliampere (165 volts divided by 150 K ohms). The common resistor 44 will then carry a current of 3.3 milliamperes. Since it must drop 25 volts, its value is selected to be about 7.57 K ohms.

In a preferred embodiment, the emitter resistors 32, 38, and 40 are coupled back to the inputs of their respective video amplifiers, as shown, to stabilize the operation of the amplifiers by using feedback.

The preferred embodiment is constructed as an integrated circuit (except for the switch 46) so that the values of the emitter resistors 32, 38, and 40 and the common resistance 44 all track closely with one another. This ensures that the 175 volt cut-off remains substantially constant even though the absolute values of those resistances may change.

Figure 3:
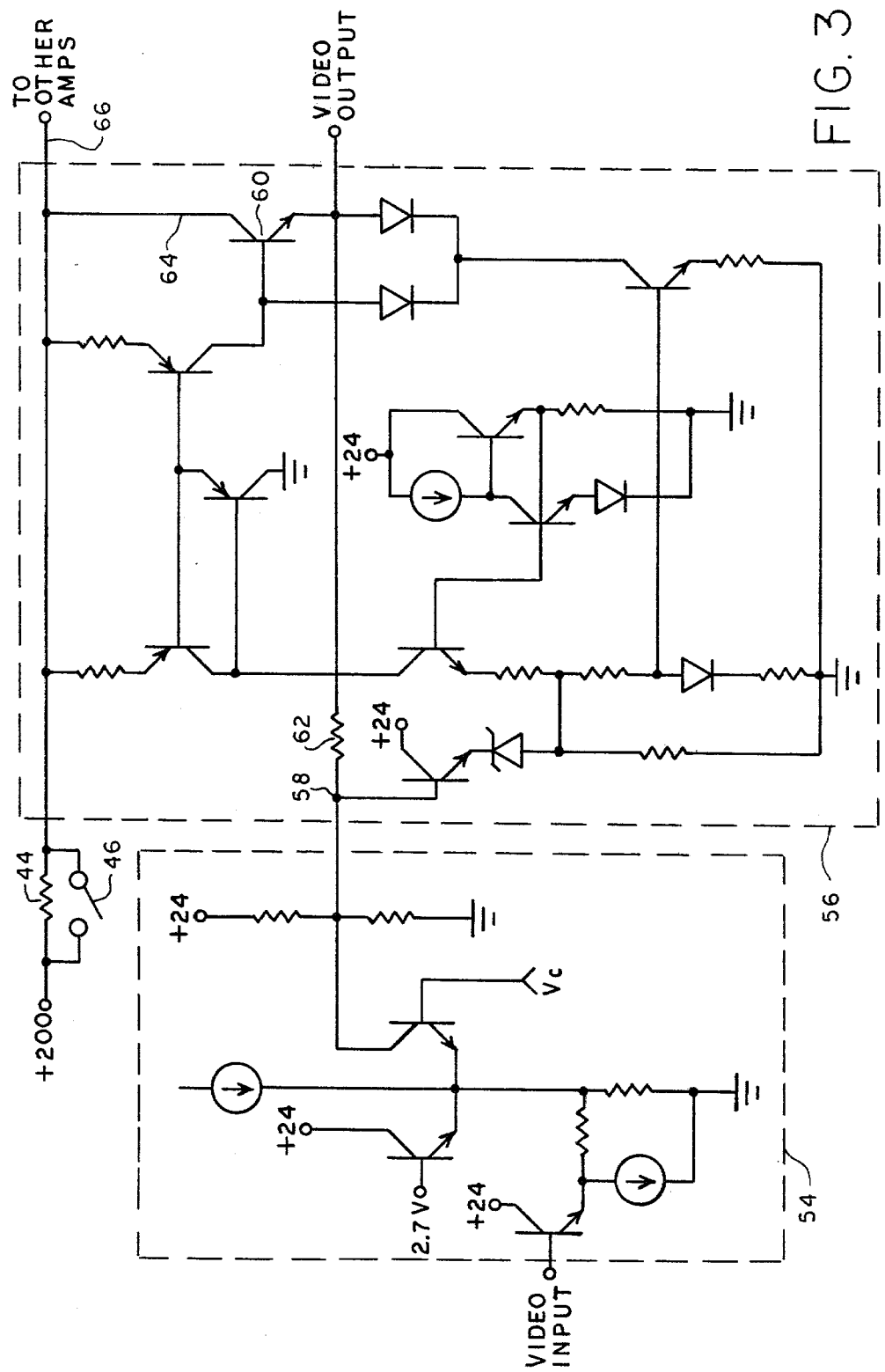
FIG. 3 shows how the G2 set-up circuit of FIG. 2 may be coupled to a particular video amplifier.

To illustrate how the set-up circuit may interface with a particular video amplifier, reference is made to FIG. 3. In this figure, a video input signal is applied to an automatic tracking network 54 which forms no part of the present invention. It is described in U.S. application Ser. No. 232,783, filed Feb. 9, 1981.

Included in the video amplifier 56 is an output transistor 60, the emitter of which is coupled via a feedback resistor 62 back to the input (node 58) of the amplifier 56. The collector of the transistor 60 is coupled via a lead 64 to the common resistance 44 and the switch 46. The junction between the switch 46 and the collector of transistor 60 is coupled via a lead 66 to the collectors of two other output transistors (not shown) in another two video amplifiers similar to the amplifier 56.

In operation, the amplifier 56 and the set-up circuit operate as described previously with reference to FIG. 2. That is, when the switch 46 is opened and the receiver's brightness control is adjusted to cut off the amplifier 56, a 175 volt potential is developed at the emitter of transistor 60 for application to one of the receiver's cathodes. A similar cut-off voltage is developed at the outputs of the amplifiers which are not shown. The G2 voltage may then be adjusted as previously described, after which the switch 46 may be closed. The receiver is then in condition for normal operation.

The set-up circuit described herein is readily integratable, and provides an inexpensive means for implementing G2 set-up. Moreover, set-up is properly achieved even though the D.C. levels which are input to the video amplifiers may differ and fail to track with one another.

Although the invention has been described in terms of a preferred embodiment, it will be obvious to those skilled in the art that various modifications and alterations may be made without departing from the invention. Accordingly, it is intended that all such modifications and alterations be included within the spirit and scope of the invention as defined by the appended claims.

What is claimed is:

1. In a television receiver whose CRT includes three cathodes and a G2 electrode, and which has three video output amplifiers for driving the cathodes, a set-up circuit for establishing three similar video output voltages for use in properly setting the G2 electrode voltage, comprising:

three video output transistors, each having an emitter, a collector and a base, and each receiving the output of one of the video amplifiers at its base;

three emitter resistances, each coupled to the emitter of one of the video output transistors for developing a video output voltage thereacross;

a common collector load;

means for coupling the collector load between a supply voltage and the collectors of the three output transistors; and means for shunting the load during normal receiver operation to apply the supply voltage to the collectors of the output transistors, and for removing the shunt from the common load during G2 set-up so that the load is coupled in series with the collectors of all the output transistors for dropping a selected voltage thereacross and establishing a common, selected output voltage at the emitters of the video output transistors.

2. A set-up circuit as set forth in claim 1 wherein each of the emitter resistances is coupled between the emitter of a video output transistor and the input of its associated video amplifier.

3. A set-up circuit as set forth in claim 1 wherein said shunting means includes a two position switch connected in parallel with the common collector load.

4. A set-up circuit as set forth in claim 3 wherein the common collector load constitutes a resistor whose value is selected to establish a predetermined D.C. output voltage at the emitters of the output transistors when the switch is open.

* * * * *